(12) United States Patent
Moshchuk et al.

(10) Patent No.: US 10,427,678 B2
(45) Date of Patent: Oct. 1, 2019

(54) SYSTEM AND METHOD FOR LOW SPEED LATERAL CONTROL OF A VEHICLE (71) Applicant: GM GLOBAL TECHNOLOGY OPERATIONS LLC, Detroit, MI (US)

(72) Inventors: Nikolai K. Moshchuk, Grosse Pointe, MI (US); Shih-ken Chen, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 190 days.

(21) Appl. No.: 15/621,242

(22) Filed: Jun. 13, 2017

(65) Prior Publication Data

US 2018/0354513 A1    Dec. 13, 2018

(51) Int. Cl.
| | |
|---|---|
| *B60W 30/12* | (2006.01) |
| *B60W 10/20* | (2006.01) |
| *G05B 1/00* | (2006.01) |
| *G05B 1/02* | (2006.01) |
| *G05D 1/00* | (2006.01) |
| *G05D 1/02* | (2006.01) |
| *B62D 6/00* | (2006.01) |
| *B62D 15/02* | (2006.01) |

(52) U.S. Cl.
CPC ............ *B60W 30/12* (2013.01); *B60W 10/20* (2013.01); *B62D 6/002* (2013.01); *B62D 15/025* (2013.01); *G05D 1/0088* (2013.01); *G05D 1/0223* (2013.01); *G05D 1/0229* (2013.01)

(58) Field of Classification Search
CPC .......... G08G 1/163; G08G 1/164; G08G 1/22; G01S 19/40; G01S 2013/9325; B60P 7/0823; B32B 5/26; D04H 3/115; D04H 1/52; B62D 6/002; B62D 15/025; B60W 10/20; B60W 30/12; G05D 1/0229; G05D 1/0088; G05D 1/0223
See application file for complete search history.

(56) References Cited

U.S. PATENT DOCUMENTS

2010/0256836 A1\* 10/2010 Mudalige ............... G08G 1/163
701/2

\* cited by examiner

*Primary Examiner* — Nga X Nguyen
(74) *Attorney, Agent, or Firm* — Quinn IP Law (57) ABSTRACT

A method for providing low speed lateral steering control for a vehicle is disclosed. The method includes receiving sensor data corresponding to a road wheel angle, determining a planned vehicle path of travel, defining a road wheel angle search range based on a maximum road wheel angle rate, determining a steering control goal using the road wheel angle that tracks and measures a difference between a current vehicle path and the planned vehicle path, determining an optimal steering control signal using the road wheel angle and the steering control goal and providing the control signal to a steering controller.

14 Claims, 5 Drawing Sheets

SYSTEM AND METHOD FOR LOW SPEED LATERAL CONTROL OF A VEHICLE

INTRODUCTION

The present invention relates generally to the field of vehicles and, more specifically, to lateral control of a vehicle at low speeds.

Autonomous driving systems typically allow some or all driving functions to be taken over by the vehicle and its onboard computers. Examples of some components of autonomous driving systems may include a lateral vehicle control system, which itself may include a lane centering system and lane keeping systems that aim to provide a wide range of assistance in keeping the vehicle within the driving lane under a number of possible and varied circumstances.

However, lateral vehicle control when the vehicle is moving at a low speed is different from lateral vehicle control when the vehicle is moving at a higher speed.

SUMMARY

Embodiments according to the present disclosure provide a number of advantages. For example, embodiments according to the present disclosure enable low speed lateral vehicle control using vehicle front steering to optimize vehicle weight distribution and tuning.

In one aspect, a method for providing low speed lateral steering control for an autonomously driven or semi-autonomously driven vehicle includes the steps of receiving, from at least one vehicle sensor, sensor data corresponding to a road wheel angle, determining, by one or more data processors, a plurality of waypoints indicating a planned vehicle path of travel, defining, by the one or more data processors, a road wheel angle search range based at least in part on a maximum road wheel angle rate, determining, by the one or more data processors, a steering control goal using the road wheel angle that tracks and measures a difference between a current vehicle path and the planned vehicle path, determining, by the one or more data processors, an optimal steering control signal using the road wheel angle and the steering control goal, and providing the control signal to a steering controller.

In some aspects, determining the optimal steering control signal includes using one-dimensional nonlinear optimization to minimize a path tracking error between the current vehicle path and the planned vehicle path.

In some aspects, minimizing the path tracking error includes minimizing both a heading error and a radial error.

In some aspects, determining a steering control goal includes defining a relationship between a steering command and a cost function.

In some aspects, the cost function includes a cost associated with a radial error and a cost associated with a heading error.

In another aspect, an automotive vehicle includes a steering system, at least one vehicle sensor, and a controller electrically connected to the steering system and the at least one vehicle sensor, the controller configured to receive, from the at least one vehicle sensor, sensor data corresponding to a road wheel angle, determine a plurality of waypoints indicating a planned vehicle path of travel, define a road wheel angle search range based at least in part on a maximum road wheel angle rate, determine a steering control goal using the road wheel angle that tracks and measures a difference between a current vehicle path and the planned vehicle path, determine an optimal steering control signal using the road wheel angle and the steering control goal, and provide the control signal to the steering system.

In some aspects, determining the optimal steering control signal includes using one-dimensional nonlinear optimization to minimize a path tracking error between the current vehicle path and the planned vehicle path.

In some aspects, minimizing the path tracking error includes minimizing both a heading error and a radial error.

In some aspects, determining a steering control goal includes defining a relationship between a steering command and a cost function.

In some aspects, the cost function includes a cost associated with a radial error and a cost associated with a heading error.

In yet another aspect, a method for providing low speed lateral control to an automotive vehicle includes the steps of receiving, from a vehicle sensor, sensor data corresponding to a road wheel angle, determining, by one or more data processors, a plurality of waypoints indicating a planned vehicle path of travel, defining, by the one or more data processors, a road wheel angle search range based on a maximum road wheel angle rate of change, designing a steering control goal using a cost function that reduces a difference between a current vehicle path and the planned vehicle path, wherein the cost function includes a cost associated with a radial error and a cost associated with a heading error, and wherein the cost function can be expressed in a nonsingular form as a function of the road wheel angle, one or more vehicle geometric parameters, and the plurality of waypoints, determining an optimal steering control signal by minimizing the cost function subject to a constraint driven by the maximum road wheel angle rate, and providing the control signal to a steering controller.

In some aspects, determining the optimal steering control signal includes using one-dimensional nonlinear optimization to minimize a path tracking error between the current vehicle path and the planned vehicle path.

In some aspects, minimizing the path tracking error includes minimizing both the heading error and the radial error.

In some aspects, the cost function has a resolvable singularity at $z=\tan \delta=0$.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Autonomous, semi-autonomous, automated, or automatic steering control features (e.g., automated lane centering, adaptive lane centering, etc.) may maintain or control the position of a vehicle with respect to the road, or with respect to a lane on the road, the lane typically demarcated by lane markings, with reduced driver input (e.g., movement of a steering wheel).

In some examples, autonomous, semi-autonomous, automated, or automatic steering control features may include a lateral vehicle control system. Typically, at lower speeds more torque may be needed to steer the vehicle than at higher speeds. The lateral vehicle control system may adapt to the singularities present when the vehicle speed is close to and nearing zero by developing a control goal that minimizes the path tracking error and using 1D nonlinear optimization to determine an optimal road wheel angle command.

In some embodiments, the lateral vehicle control system, or another onboard system in the vehicle, may measure, estimate, or evaluate, using sensor(s) associated with the vehicle, vehicle steering measurements or vehicle steering conditions such as the steering angle and steering torque of a vehicle, and in some examples, other measurements as are known in the art. Vehicle steering measurements or vehicle steering conditions may be measured, estimated, or evaluated at predetermined intervals, in some examples, every 5-100 milliseconds, e.g., every 10 milliseconds, while the vehicle is in motion.

The lateral vehicle control system may include other systems that measure steering angle, steering torque, acceleration, lateral acceleration, longitudinal acceleration, speed, yaw-rate and/or other vehicle dynamics or steering measurements while a steering control system, e.g., the lane centering system, is activated. In some embodiments, these measurements may be compiled continuously while the vehicle is in motion.

In some embodiments, the lateral vehicle control system, or a component thereof, may determine, based on the measured vehicle steering measurements (e.g., steering torque, steering angle), and/or other information (e.g., speed, acceleration, heading, yaw-rate, other driver input, and other information known in the art) of a vehicle, a control input command to be sent to one or more actuators of a lane centering system to control vehicle steering.

Figure 1:
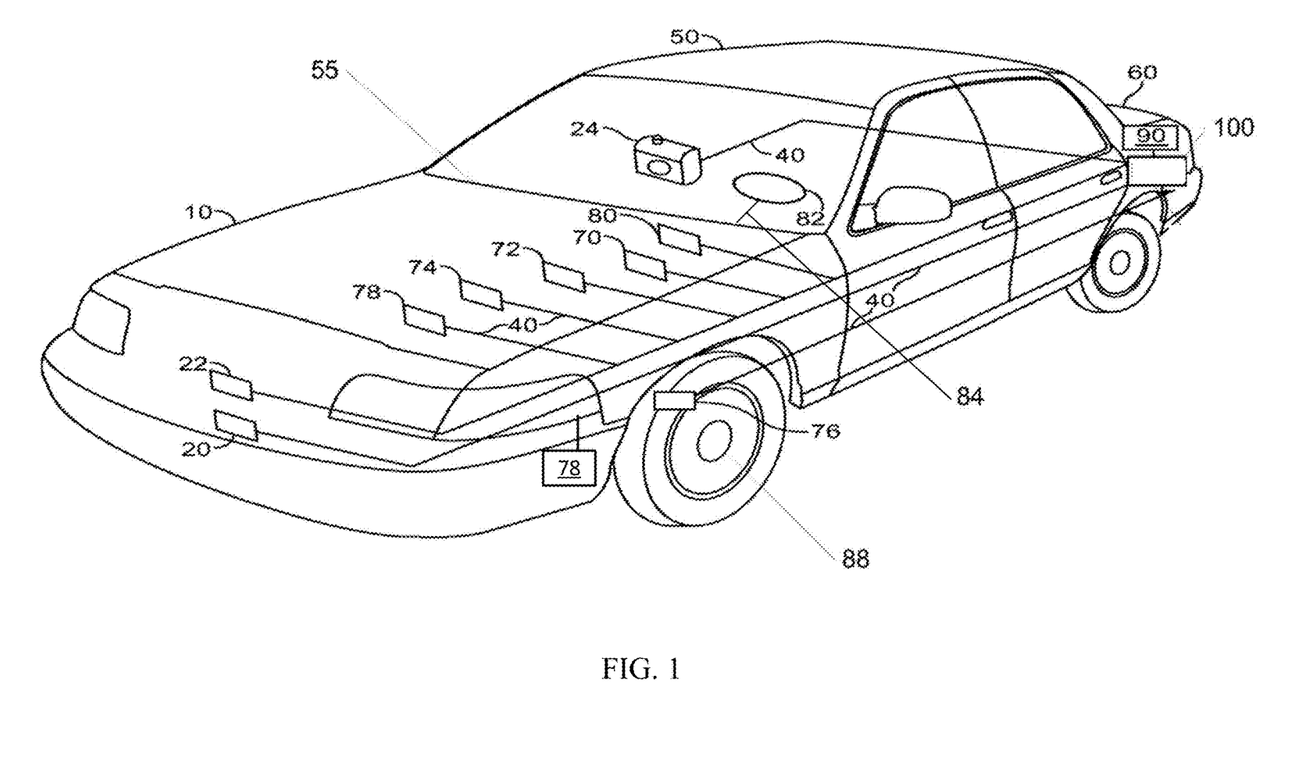
FIG. 1 is a schematic diagram of a vehicle with a lateral vehicle control system, according to an embodiment.

FIG. 1 is a schematic illustration of a vehicle with a lateral vehicle control system. The location of any particular component in the illustration is for illustrative purposes only and is not indicative of the actual location of the component.

Lateral vehicle control system 100 may operate in conjunction with or separate from one or more automatic vehicle control systems, autonomous driving applications, or a vehicle automated steering system 90. The vehicle automated steering system 90 may, for example, be one or a plurality of adaptive lane centering applications, low speed lane centering applications, lane keeping assist applications, or other applications. One or a plurality of vehicle automated steering system(s) 90 may be component(s) of the system 100, or the vehicle automated steering system(s) 90 may be separate from the system 100.

The vehicle automated steering system 90 may, when engaged, fully or partially control the steering of the vehicle 10 and reduce driver (e.g., operator of the vehicle) steering control input via the steering wheel 82 and/or steering system, which may include an electrical power steering (EPS) system and/or other components known in the art. In some embodiments, the vehicle automated steering system 90 includes one or more actuators 78 configured to steer the front and/or rear wheels in response to a steering control command received from a steering controller. In some embodiments, the steering controller is one or more of the controllers associated with the lateral vehicle control system 100, as discussed herein. One or a plurality of sensors may be attached to or associated with the vehicle 10. Sensors may include a computer vision sensor (e.g., a camera) 24, LIDAR and/or Laser Detection and Ranging (LADAR) sensor 20, radar sensor 22, imager, or other remote sensing devices known in the art that may obtain data. The data received from the one or more sensors is useful in allowing the system 100 to determine the relative location of the vehicle with respect to the road features. The road features include, for example, lane markers(s), road shoulder(s), median barrier(s), edge of the road, and/or other objects or features.

The camera 24 may, for example, measure lane offset, heading angle, lane curvature and/or other information (e.g., speed, acceleration, yaw-rate, other driver input known in the art) and provide the information to the system 90. The vehicle automated steering control system 90 or other systems may maintain or control the position of the vehicle 10 with respect to the road based on the sensor measured relative location of the vehicle with respect to road features.

In some embodiments, the vehicle 10 may include one or more devices or sensors to measure vehicle steering control, vehicle steering conditions, vehicle steering parameters, vehicle dynamics, driver input, or other vehicle related conditions or measurements. Vehicle dynamics measurement device(s) may include one or a plurality of steering angle sensor(s) 70 (e.g., connected to the steering wheel 82 and/or another component of the steering system) and/or a steering torque sensor(s) 80 (e.g., a torsion bar, torsion sensor, torque meter, torque transducer, or other device known in the art). The steering torque sensor(s) 80 may be connected to or associated with the steering wheel 82, a steering column 84, steering rack and pinion, a vehicle axle, and/or another component of the steering system known in the art. The vehicle dynamics measurement device(s) may also include one or a plurality of accelerometer(s) 72, speedometer(s) 74, wheel speed sensor(s) 76, inertial measurement unit(s) (IMU) 78, or other devices known in the art.

In some embodiments, the steering column 84 may be connected to a rack and pinion system, which converts or transforms the rotary motion of the steering wheel 82 and the steering column 84 into linear motion or displacement of the vehicle tires or wheels 88. A steering angle sensor 70 may be mounted to the steering wheel 82, the steering column 84, an electric power steering (EPS) system, an active front steering (AFS) system or be otherwise associated with the automated steering control system 90. A steering torque sensor 80 (e.g., steering torsion bar, torsion sensor, torque meter, torque transducer, or other device) may be mounted to the steering column 84, steering wheel 82, rack and pinion wheel axle or be otherwise associate with the automated steering control system 90. Steering torque sensor 80 and steering angle sensor 70 may, in some examples, be associated with or mounted on the EPS, the AFS, or other systems.

In some examples, the vehicle dynamics measurement device(s) may measure vehicle dynamics conditions or driver input including steering angle, steering torque, steering direction, lateral (i.e., angular or centripetal) acceleration, longitudinal acceleration, yaw-rate, lateral and longitudinal velocity, speed, wheel rotation, and other vehicle dynamics characteristics of vehicle 10 known in the art.

The measured vehicle dynamics, vehicle conditions, steering measurements, steering conditions, or driver input information may be transferred to system 100 via, for example, a wired link (e.g., a controller area network (CAN) bus, Flexray, Ethernet or other wired link known in the art) 40 and/or a wireless link. The measured vehicle dynamics, vehicle conditions, steering measurements, steering conditions, or driver input information data may be used by system 100 or another system to calculate steering angle, steering torque, dead reckoning based vehicle position, and other calculations.

In some embodiments, lateral vehicle control system 100 may be, or may include, a computing device mounted on a dashboard 55 of the vehicle, in a passenger compartment 50, or in a trunk 60. In some embodiments, lateral vehicle control system 100 may be located in another part of the vehicle, may be located in multiple parts of the vehicle, or may have all or part of its functionality remotely located (e.g., in a remote server, in a portable computing device such as a cellular telephone or other devices known in the art).

While various sensors and inputs are presented hereinabove, in some examples, only a subset of the information form the sensors described above, or their inputs may be used.

Figure 2:
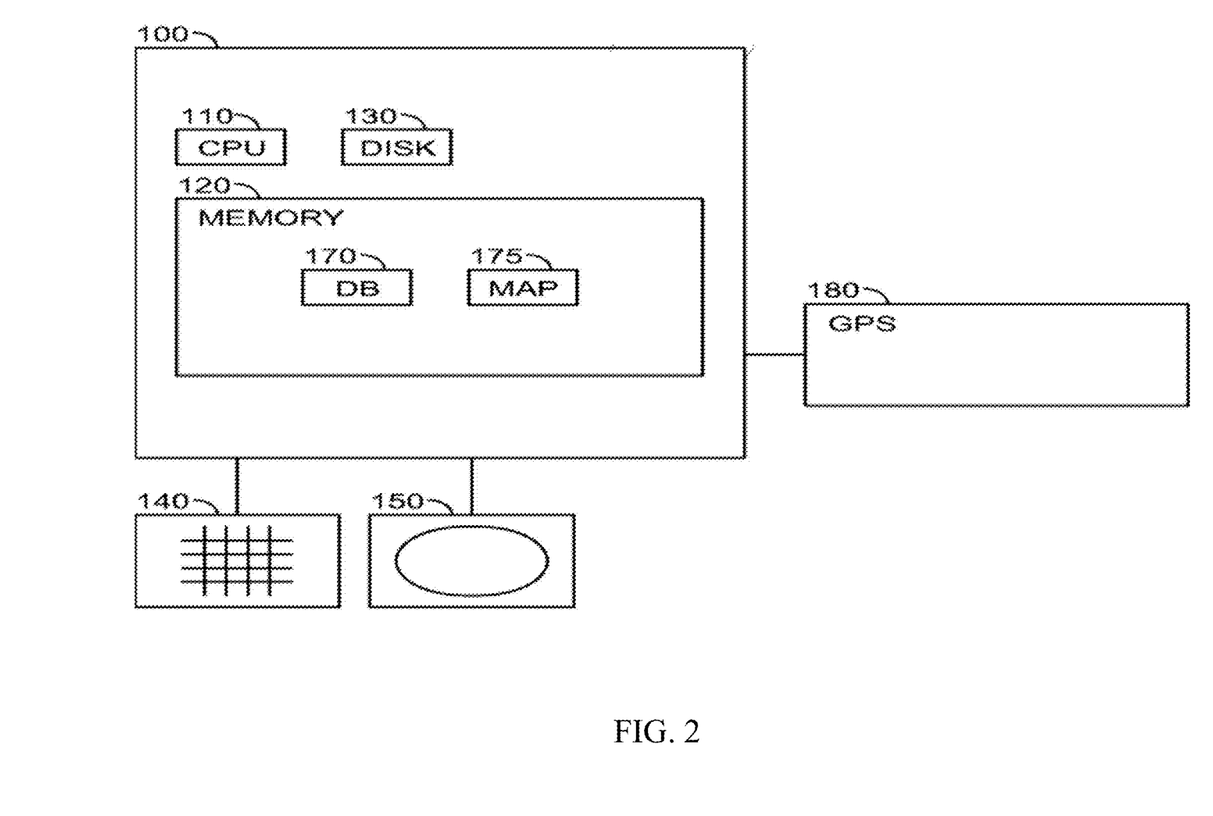
FIG. 2 is a schematic diagram of a lateral vehicle control system, according to an embodiment.

FIG. 2 is a schematic illustration of the vehicle lateral vehicle control system 100. Autonomous or automated lateral vehicle control system 100 may include one or more processor(s) or controller(s) 110, memory 120, long term storage 130, input device(s) or area(s) 140, and output device(s) or area(s) 150. Input device(s) or area(s) 140 may be, for example, a touch-screen, a keyboard, microphone, pointer device, or other device. Output device(s) or area(s) 150 may be, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, information and data regarding steering angle thresholds, steering torque thresholds, steering inertia information, steering damping information, steering stiffness information, and other information or data. Databases 170 may be stored all or partly in one or both of memory 120, long term storage 130, or another device. System 100 may also include a global positioning system (GPS) 180.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term non-transitory storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3:
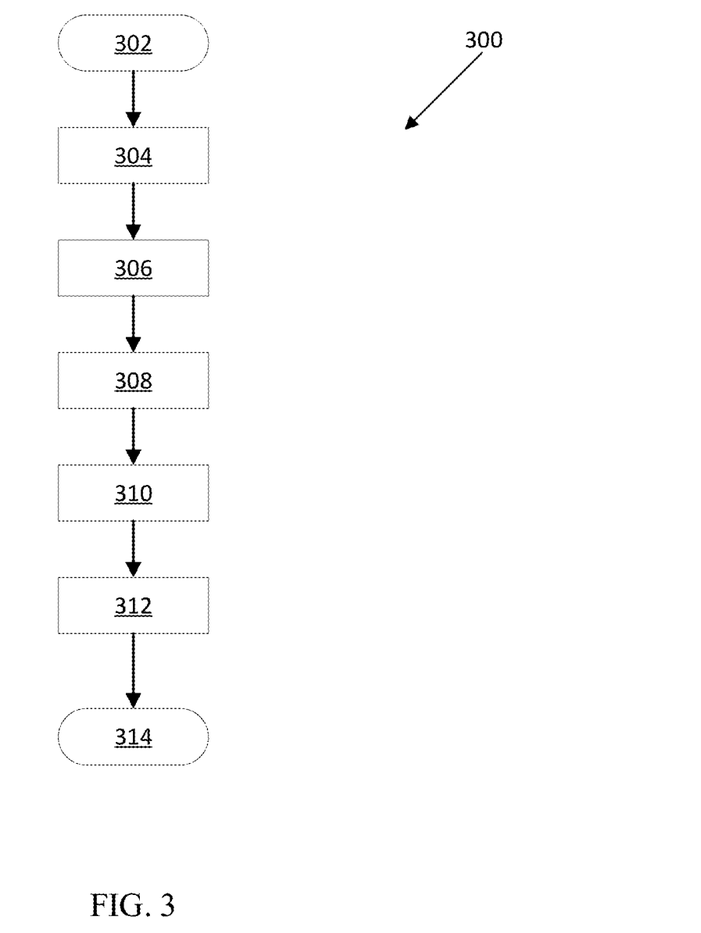
FIG. 3 is a flow chart of a method for low speed lateral vehicle control, according to an embodiment.

FIG. 3 is a flow chart of an algorithm or method 300 to provide low speed lateral control of a vehicle. The method 300 can be utilized in connection with a vehicle having one or more sensors, such as the vehicle 10. The method 300 can be utilized in connection with the various modules of the control system 100, or by other systems associated with or separate from vehicle 10, in accordance with exemplary embodiments. The order of operation of the method 300 is not limited to the sequential execution as illustrated in FIG. 3 but may be performed in one or more varying orders, or steps may be performed simultaneously, as applicable and in accordance with the present disclosure.

As shown in FIG. 3, the method 300 starts at 302 and proceeds to 304. At 304, the desired vehicle path is determined. The current steering or road wheel angle (RWA) is determined from one of the sensors of the vehicle 10, such as a steering angle sensor. Additionally, the desired vehicle path is determined from waypoints ahead of the vehicle 10. While not a part of this disclosure, the waypoints may be determined from an automated driving assistance system or ADS with input from the operator, for example and without limitation.

Figure 4:
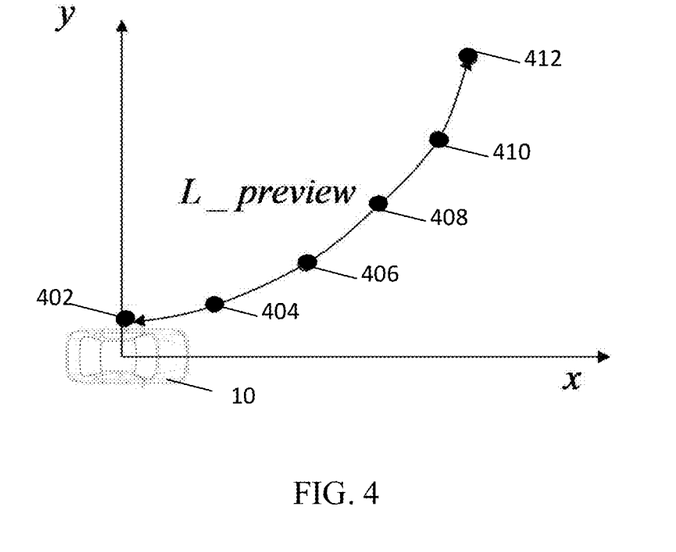
FIG. 4 is a graphical representation of a vehicle's intended path of travel as indicated by a plurality of waypoints, according to an embodiment.

With reference to FIG. 4, the waypoints are a set of points along the intended path of the vehicle, plotted in the vehicle reference frame where the x-axis indicates a longitudinal direction of travel of the vehicle and the y-axis indicates a lateral direction of travel. A preview distance, L_preview, is an arc length that encompasses all of the waypoints. The preview distance, L_preview, depends on the vehicle speed. When the vehicle is traveling at a high speed, the preview distance is the total distance forward of the vehicle recorded, for example, at every 0.1 second for a total of 1.5 seconds. For example, if 1.5 sec is the preview time, then there will be 1.5/0.1=15 waypoints. When the vehicle is traveling at high speed, the preview distance is equal to the product of speed and preview time, that is, L=V*T. This preview distance is used by the control system every 10 ms to calculate a waypoint. The waypoints are separated by 0.1 sec, meaning that the distance between the waypoints is the product of the vehicle speed and the waypoint separation time of 0.1 sec.

When the vehicle is traveling at a lower speed, the waypoints are equally spaced. At low speed, the spacing between waypoints is typically larger and the waypoints may be spaced apart by 0.5 m, for example and without limitation.

Next, at 306, the road wheel angle (RWA) command search range is defined. The RWA command search range is defined as:

RWA−MaxRWArate*SampleTime<RWA<RWA+MaxRWArate*SampleTime

Where:
MaxRWArate is the maximum RWA rate; and
SampleTime is a predetermined sampling interval of the RWA sensor.

In some embodiments, for example and without limitation, the sampling interval is 10 ms.

Next, at 308, a control goal is designed that minimizes the path tracking error. The path tracking error is the difference or deviation, both in radial distance and heading angle, between the vehicle's predicted path and the planned trajectory.

Figure 5:
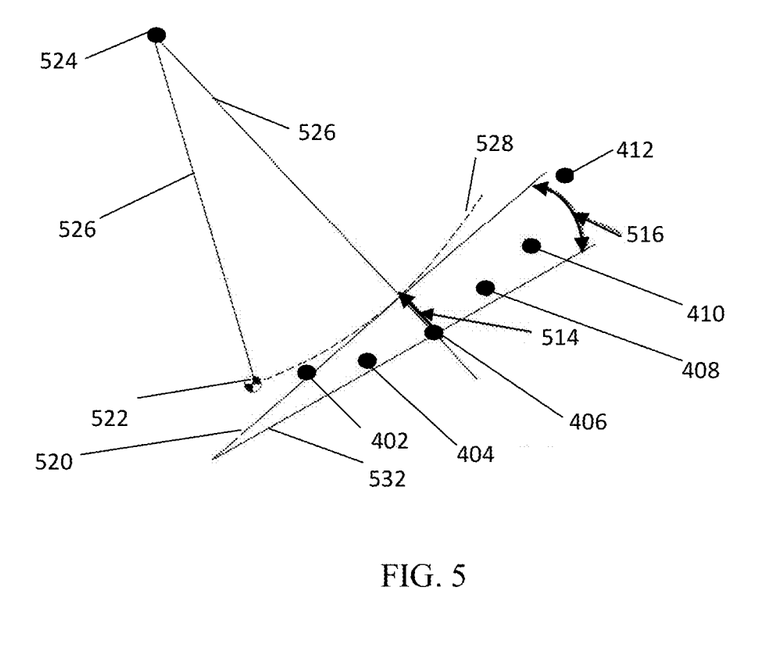
FIG. 5 is a graphical representation of a vehicle's intended path of travel and the vehicle's predicted path of travel, according to an embodiment.

With reference to FIG. 5, the vehicle 10 has a planned trajectory or path as indicated by the waypoints 402, 404, 406, 408, 410, 412. The center of gravity (CG) 522 of the vehicle 10 travels along a predicted path or trajectory 528 and the vehicle's center of rotation is indicated by reference 524. As shown, the vehicle's predicted path 528 deviates from the planned trajectory indicated by the waypoints.

To minimize the path tracking error, a radial error 514 and a heading error 516 are defined. The radial or lateral distance error, $\Delta L_i$, 514, is defined as the radial distance between a line 520 tangent to the predicted trajectory 528 and a line 532 tangent to the waypoint trajectory at each waypoint. The heading error, $\Delta \varphi_i$, 516, is defined as the difference in heading angle between the line 520 tangent to the predicted trajectory 528 and the line 532 tangent to the waypoint trajectory at each waypoint.

Figure 6:
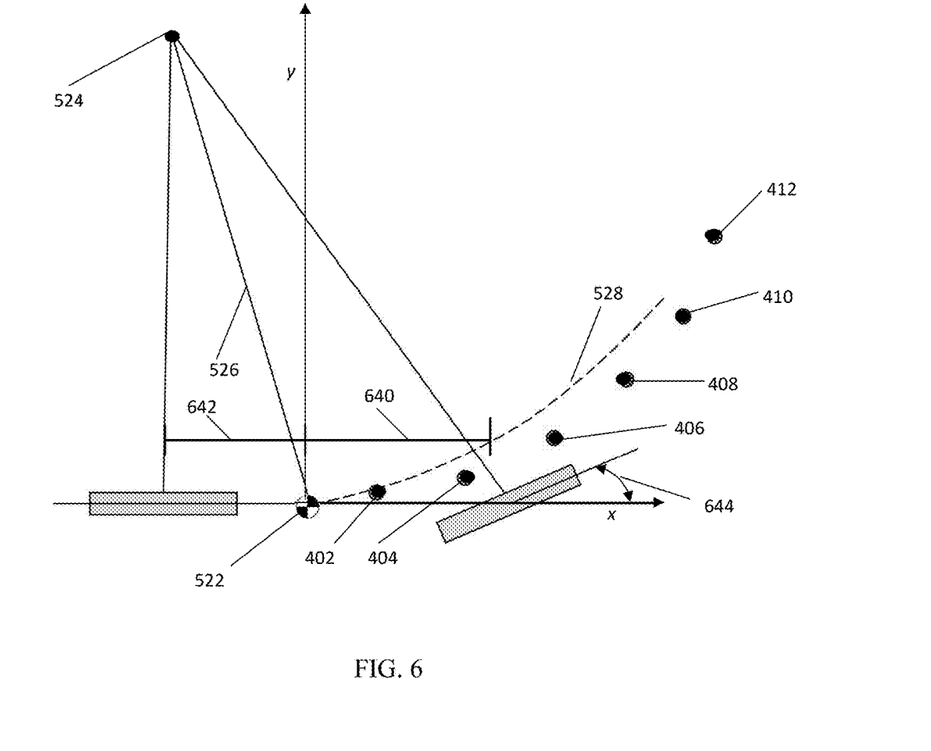
FIG. 6 is another graphical representation of a vehicle's intended path of travel and the vehicle's predicted path of travel, according to an embodiment.

As shown in FIG. 6, similar to FIG. 5, the vehicle has a planned trajectory or path as indicated by the waypoints 402, 404, 406, 408, 410, 412. The center of gravity (CG) 522 of the vehicle travels along a predicted path or trajectory 528. A vehicle center of rotation 524 is defined as the intersection of the radii 526 of the vehicle's project path 528. As shown, the vehicle's predicted path 528 deviates from the planned trajectory indicated by the waypoints.

The vehicle reference frame is defined as a longitudinal and lateral (x, y) coordinate system centered on the vehicle's center of gravity (CG) 522. Each of the waypoints 402, 404, 406, 408, 410, 412 can be expressed in coordinates of the vehicle reference frame as ($x_j$, $y_j$). A longitudinal distance from the CG 522 to the front axle of the vehicle is defined as distance a, shown on FIG. 6 as distance 640. A longitudinal distance from the CG 522 to the rear axle of the vehicle is defined as distance b, shown on FIG. 6 as distance 642. The longitudinal length of the vehicle L from the front axle to the rear axle is defined as L=a+b. The road wheel or steering angle RWA 644 is expressed as δ.

The vehicle's center of rotation 524 can be expressed in coordinates of the vehicle reference frame as:

$$O\left(-b, \frac{L}{\tan \delta}\right)$$

The length of the radius ($R_C$) 526 is defined as:

$$R_C = \frac{L}{\tan \delta}\sqrt{1 + \frac{b^2}{L^2}\tan^2 \delta}$$

where:
L is the longitudinal length of the vehicle 10 from the front axle to the rear axle;
δ is the RWA; and
b is the longitudinal distance from the CG 522 to the rear axle of the vehicle.

The control goal is designed by performing a cost function analysis as set forth below.

The cost function is defined as:

$$J = J_L + J_\varphi$$

where:
$J_L$ is the cost associated with distance (radial) error; and
$J_\varphi$ is the cost associated with a heading error.
$J_L$ and $J_\varphi$ are expressed as follows:

$$J_L = \frac{1}{N}\sum_{j=1}^{N} w_j^L \Delta L_i^2$$

$$J_\varphi = \frac{1}{N}\sum_{j=1}^{N} w_j^L \Delta \varphi_i^2$$

where $w_j$ is a weighting factor that can be tuned depending on the importance of a selected segment of the vehicle's projected path, such as a curve or turn, for example and without limitation and N is the number of waypoints.

The cost function has a resolvable singularity at z≡tan δ=0 (that is, when the vehicle is traveling in a straight line). Rewriting the costs associated with radial error and heading error in nonsingular form:

$$J_L = \frac{1}{N} \sum_{j=1}^{N} w_j^L \left[\frac{(x_j^2 + 2x_j b + y_j^2)\tan \delta - 2y_j L}{\sqrt{[(x_j+b)^2 + y_j^2]\tan^2 \delta - 2y_j L \tan \delta + L^2} + \sqrt{L^2 + b^2 \tan^2 \delta}}\right]^2$$

$$J_\varphi = \frac{1}{N}\sum_{j=1}^{N} w_j^\varphi \left[\varphi_j + a\tan\frac{(x_j+b)z}{y_j z - L}\right]^2$$

Each of the cost functions J is therefore a function of the tangent of the RWA, vehicle geometric parameters, and waypoints. The variable z is an optimal control variable that can be determined.

Referring back to FIG. 3, at 310, one-dimensional (1D) nonlinear optimization is used to minimize the radial and heading errors and determine the optimal road wheel angle (RWA) command.

The optimal control solution to minimize the cost function J is:

$$\text{Min } J(z, x_j, y_j), \text{ where } z_1 \leq z \leq z_2.$$

Solution of this nonlinear scalar function optimization is the tangent of the optimal road wheel angle (RWA):

$$z = \arg\min J(z, x_j, y_j) = \tan \delta$$

The optimization is subjected to a constraint driven by the maximum road wheel angle rate, which in turn translates into a constraint for the derivative of z:

$$\dot{z}_1 \leq \dot{z} \leq \dot{z}_2$$

Any numerical method for one-dimensional scalar function minimization can be applied to solve the optimization function. For example and without limitation, Brent's method (with derivative) can be used. In some embodiments, previous optimal z values can be used as the starting point for subsequent iterations.

Solving for and/or applying the cost function typically will provide the steering angle to minimize radial and heading errors of the vehicle's predicted path of travel when the vehicle is traveling at low speeds (for example, less than 10-15 mph).

Next, at 312, the road wheel angle command is converted into a steering angle or torque command via equations known in the art and a control input command is sent from the lateral vehicle control system 100 to the front and/or rear actuator to control vehicle steering. After the control input command is set to the front and/or rear actuator to control vehicle steering, the method 300 proceeds to block 314 and ends.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term. "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be onboard as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for providing low speed lateral steering control for an autonomously driven or semi-autonomously driven vehicle, the method comprising:
   receiving, from at least one vehicle sensor, sensor data corresponding to a road wheel angle;
   determining, by one or more data processors, a plurality of waypoints indicating a planned vehicle path of travel;
   defining, by the one or more data processors, a road wheel angle search range based at least in part on a maximum road wheel angle rate;
   determining, by the one or more data processors, a steering control goal using the road wheel angle that tracks and measures a difference between a current vehicle path and the planned vehicle path and defining a relationship between a steering command and a cost function, the cost function including a cost associated with a radial error and a cost associated with a heading error;
   determining, by the one or more data processors, an optimal steering control signal using the road wheel angle and the steering control goal; and
   providing the control signal to a steering controller.

2. The method of claim 1, wherein determining the optimal steering control signal includes using one-dimensional nonlinear optimization to minimize a path tracking error between the current vehicle path and the planned vehicle path.

3. The method of claim 2, wherein minimizing the path tracking error includes minimizing both a heading error and a radial error.

4. The method of claim 1, wherein the cost function is defined by the equation:

$$J = J_L + J_\varphi$$

where $J_L$ is the cost associated with the radial error and $J_\varphi$ is the cost associated with the heading error and $J_L$ and $J_\varphi$ are expressed with the following equations:

$$J_L = \frac{1}{N}\sum_{j=1}^{N} w_j^L \Delta L_i^2$$

$$J_\varphi = \frac{1}{N}\sum_{j=1}^{N} w_j^L \Delta \varphi_i^2$$

where $w_j$ is a tunable weighting factor that is selected based on an importance of a segment of the projected vehicle path and N is a number of waypoints.

5. An automotive vehicle, comprising:
   a steering system;
   at least one vehicle sensor;
   a controller electrically connected to the steering system and the at least one vehicle sensor, the controller configured to
      receive, from the at least one vehicle sensor, sensor data corresponding to a road wheel angle;
      determine a plurality of waypoints indicating a planned vehicle path of travel;
      define a road wheel angle search range based at least in part on a maximum road wheel angle rate;
      determine a steering control goal using the road wheel angle that tracks and measures a difference between a current vehicle path and the planned vehicle path and defining a relationship between a steering command and a cost function, the cost function including a cost associated with a radial error and a cost associated with a heading error;
      determine an optimal steering control signal using the road wheel angle and the steering control goal; and
      provide the control signal to the steering system.

6. The automotive vehicle of claim 5, wherein determining the optimal steering control signal includes using one-dimensional nonlinear optimization to minimize a path tracking error between the current vehicle path and the planned vehicle path.

7. The automotive vehicle of claim 6, wherein minimizing the path tracking error includes minimizing both a heading error and a radial error.

8. The automotive vehicle of claim 5, wherein the cost function is defined by the equation:

$$J = J_L + J_\varphi$$

where $J_L$ is the cost associated with the radial error and $J_\varphi$ is the cost associated with the heading error and $J_L$ and $J_\varphi$ are expressed with the following equations:

$$J_L = \frac{1}{N}\sum_{j=1}^{N} w_j^L \Delta L_i^2$$

$$J_\varphi = \frac{1}{N}\sum_{j=1}^{N} w_j^L \Delta \varphi_i^2$$

where $w_j$ is a tunable weighting factor that is selected based on an importance of a segment of the projected vehicle path and N is a number of waypoints.

9. A method for providing low speed lateral control to an automotive vehicle, the method comprising:

receiving, from a vehicle sensor, sensor data corresponding to a road wheel angle;

determining, by one or more data processors, a plurality of waypoints indicating a planned vehicle path of travel;

defining, by the one or more data processors, a road wheel angle search range based on a maximum road wheel angle rate of change;

designing a steering control goal using a cost function that reduces a difference between a current vehicle path and the planned vehicle path, wherein the cost function includes a cost associated with a radial error and a cost associated with a heading error, and wherein the cost function can be expressed in a nonsingular form as a function of the road wheel angle, one or more vehicle geometric parameters, and the plurality of waypoints;

determining an optimal steering control signal by minimizing the cost function subject to a constraint driven by the maximum road wheel angle rate; and providing the control signal to a steering controller.

10. The method of claim 9, wherein the cost function is defined by the equation:

$$J = J_L + J_\varphi$$

where $J_L$ is the cost associated with the radial error and $J_\varphi$ is the cost associated with the heading error and $J_L$ and $J_\varphi$ are expressed with the following equations:

$$J_L = \frac{1}{N} \sum_{j=1}^{N} w_j^L \Delta L_i^2$$

$$J_\varphi = \frac{1}{N} \sum_{j=1}^{N} w_j^L \Delta \varphi_i^2$$

where $w_j$ is a tunable weighting factor that is selected based on an importance of a segment of the projected vehicle path, L, and N is a number of waypoints.

11. The method of claim 9, wherein determining the optimal steering control signal includes using one-dimensional nonlinear optimization to minimize a path tracking error between the current vehicle path and the planned vehicle path.

12. The method of claim 11, wherein minimizing the path tracking error includes minimizing both the heading error and the radial error.

13. The method of claim 10, wherein the cost function has a resolvable singularity at $z \equiv \tan \delta = 0$.

14. The method of claim 13, wherein $J_L$ and $J_\varphi$ are expressed with the following equations:

$$J_L = \frac{1}{N} \sum_{j=1}^{N} w_j^L \left[ \frac{(x_j^2 + 2x_j b + y_j^2)\tan \delta - 2y_j L}{\sqrt{[(x_j+b)^2 + y_j^2]\tan^2 \delta - 2y_j L \tan \delta + L^2} + \sqrt{L^2 + b^2 \tan^2 \delta}} \right]^2 \text{ and}$$

$$J_\varphi = \frac{1}{N} \sum_{j=1}^{N} w_j^\varphi \left[ \varphi_j + a\tan\frac{(x_j+b)z}{y_j z - L} \right]^2.$$

* * * * *